(12) United States Patent
Okano

(10) Patent No.: US 9,921,457 B2
(45) Date of Patent: Mar. 20, 2018

(54) LIGHTING DEVICE

(71) Applicant: CANON KABUSHIKI KAISHA, Tokyo (JP)

(72) Inventor: Yoshinobu Okano, Shiraoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 15/170,792

(22) Filed: Jun. 1, 2016

(65) Prior Publication Data

US 2016/0357090 A1 Dec. 8, 2016

(30) Foreign Application Priority Data

Jun. 5, 2015 (JP) ................. 2015-115231

(51) Int. Cl.
*G03B 15/02* (2006.01)
*G03B 15/05* (2006.01)

(52) U.S. Cl.
CPC ...... *G03B 15/05* (2013.01); *G03B 2215/0514* (2013.01); *G03B 2215/0592* (2013.01)

(58) Field of Classification Search
CPC ............ G03B 15/05; G03B 2215/0592; G03B 2215/0514
See application file for complete search history.

(56) References Cited

U.S. PATENT DOCUMENTS

2003/0007359 A1* 1/2003 Sugawara ............... G03B 15/05
362/326
2015/0212392 A1* 7/2015 Man ....................... G03B 15/06
362/18

FOREIGN PATENT DOCUMENTS

JP 2005043688 A 2/2005
JP 2008129301 A 6/2008

* cited by examiner

*Primary Examiner* — Evan Dzierzynski
(74) *Attorney, Agent, or Firm* — Canon U.S.A., Inc. IP Division

(57) ABSTRACT

A lighting device capable of changing the light irradiation range includes a light emitting portion, and an optical member disposed in front of the light emitting portion. The optical member has a plurality of shapes such that two types of cylindrical concave surface having axial directions substantially perpendicular to each other are crossed each other. The plurality of shapes are formed in a central region of an entry surface through which light from the light emitting portion enters or a central region of an exit surface through which the light entering through the entry surface exits.

11 Claims, 11 Drawing Sheets

SECTION VIIIB-VIIIB

SECTION VIIIC-VIIIC

LIGHTING DEVICE

BACKGROUND OF THE INVENTION

Field of the Invention

The present invention relates to lighting devices capable of changing the light irradiation range.

Description of the Related Art

Heretofore, there have been known lighting devices capable of changing the light irradiation range (the irradiation range of the lighting devices) (hereinafter also referred to as zoom strobe devices). Some of such zoom strobe devices use a method in which the irradiation range is changed by changing the distance between a light emitting portion including a light source and a reflection umbrella reflecting light emitted from the light source and an optical panel disposed in front of the light emitting portion and refracting light from the light emitting portion. When using this method, for example, the irradiation range is widened by reducing the distance between the optical panel and the light emitting portion when performing wide-angle photographing, in which the angle of view is widened, with a photographing device, and the irradiation range is narrowed by increasing the distance between the optical panel and the light emitting portion when performing telephoto photographing, in which the angle of view is narrowed, with the photographing device.

In such zoom strobe devices, it is necessary to obtain the irradiation range suitable for wide-angle photographing of the photographing device and the quantity of light suitable for telephoto photographing of the photographing device. So, Japanese Patent Laid-Open No. 2008-129301 and Japanese Patent Laid-Open No. 2005-43688 propose a strobe device in which different optical systems are formed in the vicinity of the center of an optical panel used in wide-angle photographing and in the peripheral part of the optical panel used in telephoto photographing.

Japanese Patent Laid-Open No. 2008-129301 discloses a strobe device that has, in the central part of an optical panel, a collecting optical system having the same area as the opening area of a light emitting portion and another collecting optical system in the peripheral part, and in which the collecting optical system in the central part is wide compared to the peripheral part.

Japanese Patent Laid-Open No. 2005-43688 discloses a strobe device having a plurality of optical panels having different surface shapes.

In the strobe device disclosed in Japanese Patent Laid-Open No. 2008-129301, the light distribution in a wide-angle state in which the irradiation range is maximized can be improved. However, the region of the optical panel that is used in the wide-angle state is also used in a telephoto state in which the irradiation range is minimized, and therefore the quantity of light decreases. In order to obtain the necessary quantity of light in the strobe device disclosed in Japanese Patent Laid-Open No. 2008-129301, there is no choice but to increase the travel distance of the light emitting portion. Doing so increases the size of the strobe device.

The strobe device disclosed in Japanese Patent Laid-Open No. 2005-43688 employs a plurality of optical panels and needs a complex configuration. In addition, since the number of components increases, the size and cost of the strobe device increase.

SUMMARY OF THE INVENTION

The present invention provides a lighting device capable of changing the light irradiation range that is capable of suppressing a decrease in the quantity of light when the irradiation range is narrowed, while suppressing an increase in size of the device.

In an aspect of the present invention, a lighting device capable of changing the light irradiation range includes a light emitting portion, and an optical member disposed in front of the light emitting portion. The optical member has a plurality of shapes such that two types of cylindrical concave surface having axial directions substantially perpendicular to each other are crossed each other. The plurality of shapes are formed in a central region of an entry surface through which light from the light emitting portion enters or a central region of an exit surface through which the light entering through the entry surface exits.

Further features of the present invention will become apparent from the following description of exemplary embodiments with reference to the attached drawings.

DESCRIPTION OF THE EMBODIMENTS

Figure 1:
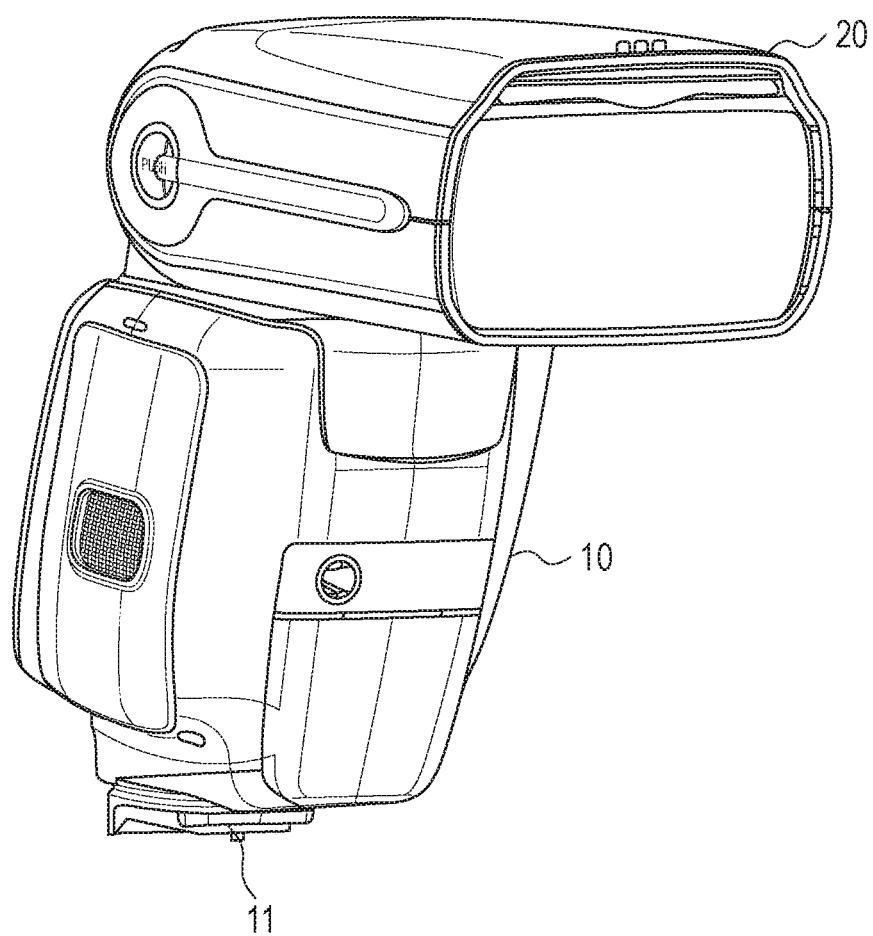
FIG. 1 is an overall view of a strobe device according to an embodiment of the present invention.

An embodiment of the present invention will now be described with reference to the drawings. In each figure, the same components are given the same reference numerals, and redundant description thereof will be omitted.

FIG. 1 illustrates a lighting device (hereinafter also referred to as a strobe device) detachable from a photographing device such as a digital camera. This strobe device consists of a mounting portion 11 for mounting on an accessory shoe of a photographing device, a main body 10 having a control circuit (not shown) and the like, and a movable portion 20 movable relative to the main body 10 and having a light emitting portion 21 and an optical panel 1 described later.

Figure 2:
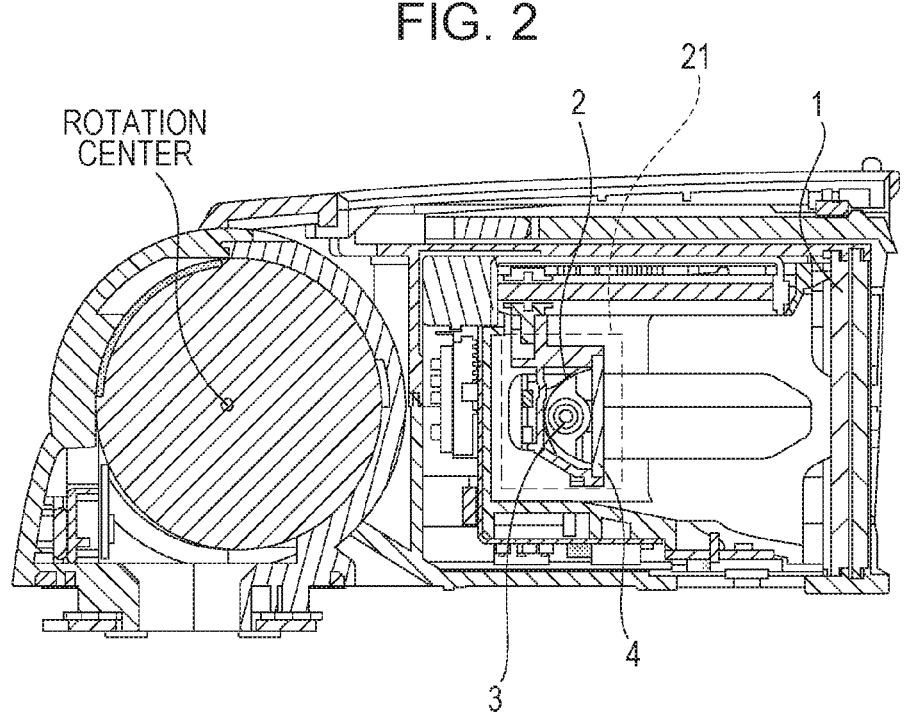
FIG. 2 is a sectional view of a movable portion of the strobe device according to the embodiment of the present invention.

FIG. 2 is a sectional view perpendicular to the rotation center (axis of rotation) when vertically rotating the movable portion 20 relative to the main body 10, with the light emitting portion 21 moved to a position farthest from the optical panel 1 within a movable range (telephoto end side).

The light emitting portion 21 includes a cylindrical xenon tube 3 serving as a light source, a reflection umbrella 2 that is a reflecting member reflecting light rays emitted from the xenon tube 3 toward the optical panel 1, and a protective panel 4 protecting the xenon tube 3. The optical panel 1 is disposed in front of the light emitting portion 21 (on the side to which light from the light emitting portion 21 is directed), and can collect or uniformly diffuse light rays from the light emitting portion 21. The light rays passing through the optical panel 1 are emitted to the outside of the movable portion 20. The protective panel 4 is disposed immediately in front of the light emitting portion 21, prevents dust from entering the light emitting portion 21, prevents degradation in the optical characteristic, and prevents radiant heat from the xenon tube 3 from being directly applied to the optical panel 1. The protective panel 4 is formed of a highly heat-resistant material such as a glass material. Instead of the xenon tube 3, an LED unit in which a plurality of LEDs are arranged in the same direction as the longitudinal direction of the xenon tube 3 may be used as a light source.

The light emitting portion 21 is movable by a motor or a moving mechanism (not shown) in a direction such that the distance to the optical panel 1 changes. Although, in this embodiment, the optical panel 1 is fixed to the movable portion 20 and the light emitting portion 21 is moved by a motor or a moving mechanism (not shown), the optical panel 1 may be moved by a motor or a moving mechanism (not shown). Although, in this embodiment, the reflection umbrella 2, the xenon tube 3, and the protective panel 4 are integrally fixed and the relative positions of the xenon tube 3 and the reflection umbrella 2 do not change, the relative positions of the xenon tube 3 and the reflection umbrella 2 may be changed. The configuration in which the light emitting portion 21 is movable in a direction such that the distance to the optical panel 1 changes is not limited. For example, a holding member holding the light emitting portion 21 may be moved by the force of a motor along a guide shaft, or the configuration disclosed in Japanese Patent Laid-Open No. 2005-43688 may be employed.

In the state illustrated in FIG. 2, light rays emitted from the light emitting portion 21 are most collected, and the irradiation range is narrowest. Therefore, this state is effective in a case in which the focal length of the photographing device is long, and in a case in which light rays emitted from the light emitting portion 21 are desired to efficiently reach far. On the other hand, in a case in which the irradiation range is desired to be maximized, the light emitting portion 21 is moved to a position closest to the optical panel 1 within the movable range (wide-angle end side).

Figure 12:
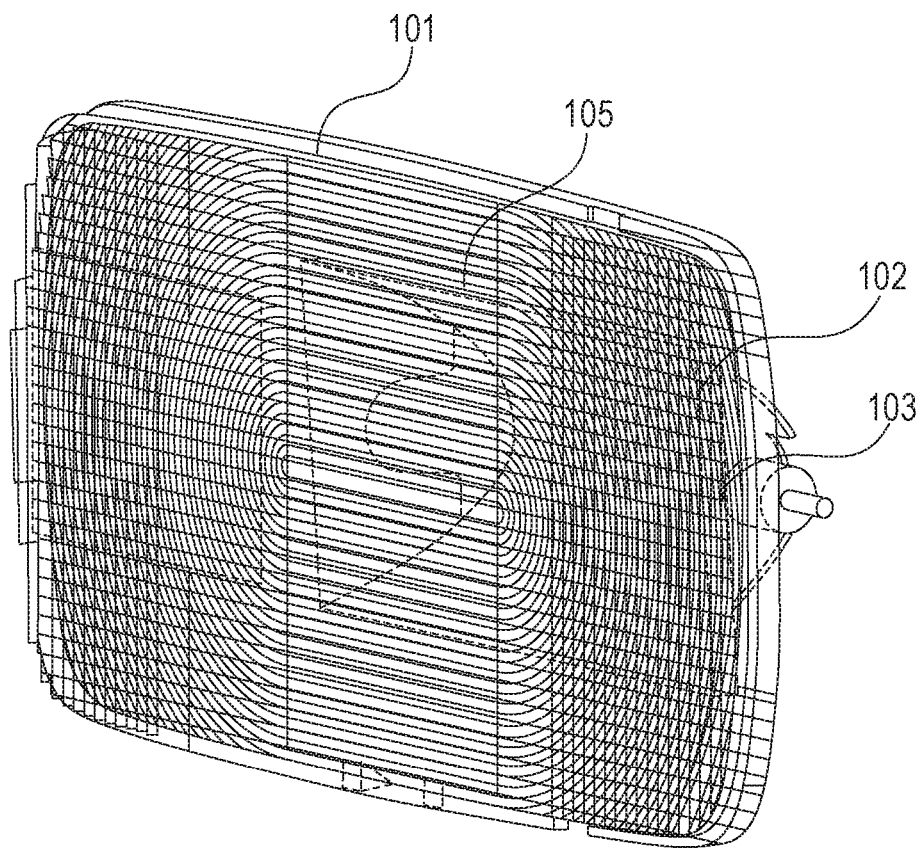
FIG. 12 is a perspective view of a main optical system relating to the irradiation range of a strobe device of a reference example.
Figure 13A:
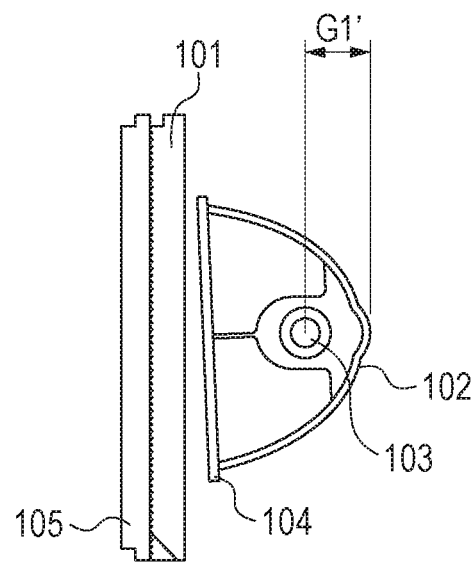
FIGS. 13A and 13B are central sectional views of the main optical system relating to the irradiation range of the strobe device of the reference example.
Figure 13B:
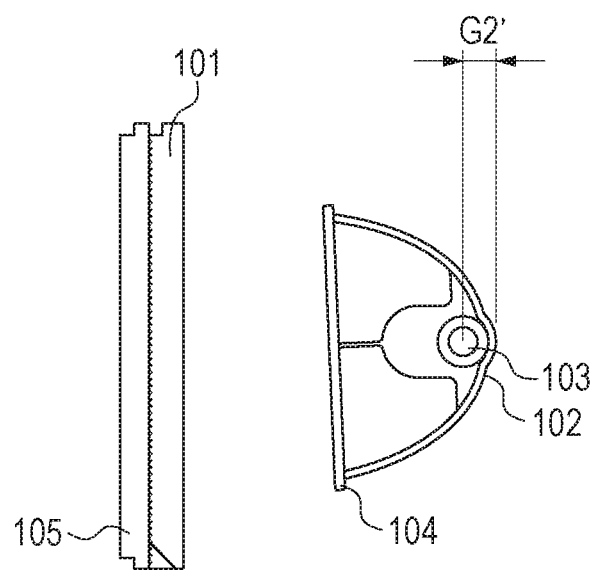
Figure 14A:
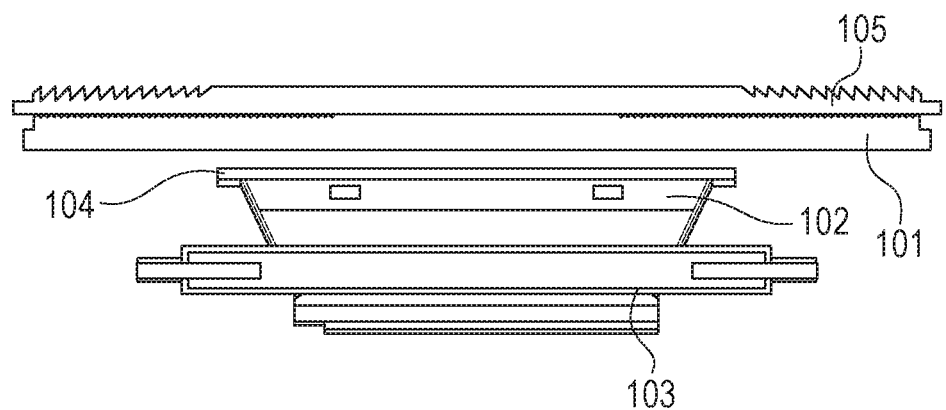
FIGS. 14A and 14B are horizontal sectional views of the main optical system relating to the irradiation range of the strobe device of the reference example.
Figure 14B:
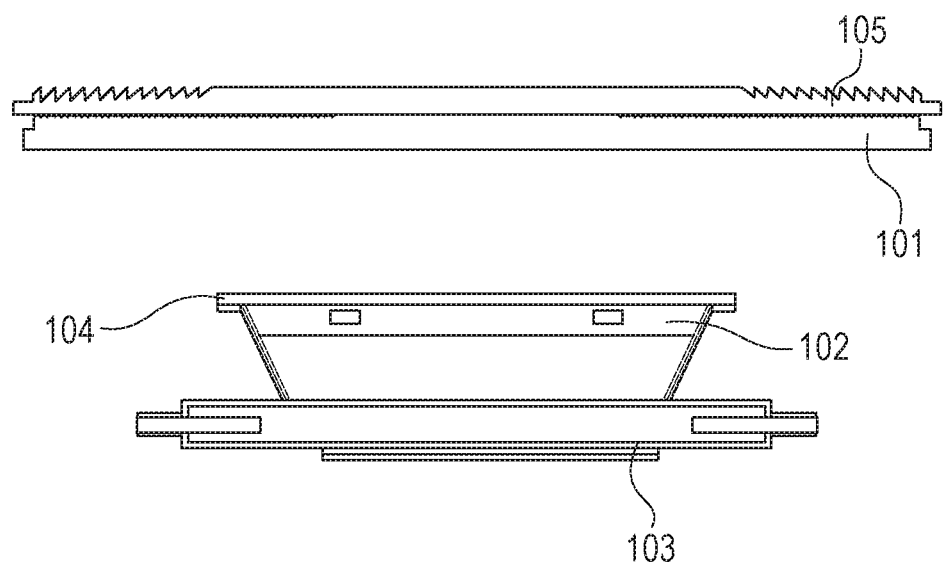

Next, a method for reducing the size of a strobe device and adverse effects thereof will be described with reference to FIG. 12 to FIG. 14B. FIG. 12 is a perspective view of a part relating to the irradiation range (main optical system) of a zoom strobe device of a reference example, FIGS. 13A and 13B are central vertical sectional views of the main optical system illustrated in FIG. 12, and FIGS. 14A and 14B are horizontal sectional views of the main optical system illustrated in FIG. 12. FIG. 13A and FIG. 14A illustrate a state in which a light emitting portion is moved to the wide-angle end side (wide-angle state). FIG. 13B and FIG. 14B illustrate a state in which the light emitting portion is moved to the telephoto end side (telephoto state).

First and second optical panels 101 and 105 are fixed to the main body of the strobe device. The first optical panel 101 is disposed on the side closer to the light emitting portion having a reflection umbrella 102, a xenon tube 103, and a protective panel 104. A Fresnel lens portion having power in the vertical direction is formed in the central part of the light exit side surface of the first optical panel 101, and ring-shaped Fresnel lens portions are formed in the left and right peripheral parts thereof. Fresnel lens portions having power in the horizontal direction are formed only in the left and right peripheral parts of the light exit side surface of the second optical panel 105 disposed on the light exit side of the first optical panel 101. A plurality of cylindrical convex surfaces having axial directions parallel to the longitudinal direction of the xenon tube 103 are formed on the light emitting portion side surface of each of the first and second optical panels 101 and 105.

As illustrated in the sectional views of FIGS. 13A to 14B, the reflection umbrella 102 and the xenon tube 103 each move relative to the first and second optical panels 101 and 105. Specifically, in the case of the state illustrated in FIG. 13A and FIG. 14A, the light emitting portion is closest to the optical panel 101. In this state, the irradiation range in the vertical direction is widest. In this state, the xenon tube 103 is farthest from the reflection umbrella 102, and the distance between the back end of the reflection umbrella 102 and the center of the xenon tube 103 is at its maximum value G1'. On the other hand, in the case of the state illustrated in FIG. 13B and FIG. 14B, the light emitting portion is farthest from the optical panel 101. In this state, the xenon tube 103 is closest to the reflection umbrella 102, and the distance between the back end of the reflection umbrella 102 and the center of the xenon tube 103 is at its minimum value G2'.

In general, an optical system that changes the irradiation range by changing the positional relationship between a xenon tube and a reflection umbrella can largely change the irradiation range in a small space in the light irradiation direction. However, there is a problem in that the irradiation range is largely changed by a small change in the positional relationship between the xenon tube and the reflection umbrella, and therefore the control is not easy. A possible method for easing this problem is to make the shape of the reflection umbrella relatively large to thereby apparently reduce the change in the relative positions of the xenon tube and the reflection umbrella. However, the ratio of the opening area of the reflection umbrella to the opening area of the optical panel increases. As a result, the same region of the optical panel must be used in the telephoto state and the wide-angle state, and independent light ray control is impossible. When the size of the reflection umbrella is increased, the weight increases, the load on the drive system also increases, and therefore it takes a long time to move the reflection umbrella.

Next, the light distribution characteristic in the horizontal direction of the strobe device of the reference example will be described. In the case of the wide-angle state, the region of use of each of the first and second optical panels 101 and 105 is slightly larger than the opening area of the reflection umbrella 102, and is limited to the central region in the vertical direction and the horizontal direction. In this state, the first optical panel 101 is in a state in which, on the object side, the region of the Fresnel lens portion having power in the vertical direction in the central part and a part of each of the regions of the left and right ring-shaped Fresnel lens portions have an influence on the optical characteristic. In the central part and its vicinity, although a horizontally-extending Fresnel lens portion exists, it has no light collecting power in the horizontal direction. As for the ring-shaped Fresnel lens portions, only regions having weak refractive power in the central parts of the ring shapes relate to the irradiation range, but the light collecting effect in the horizontal direction is weak. The object side of the second optical panel 105 is a planar surface and has no light collecting effect. As a result, the influence of the refractive power of each Fresnel lens portion in the horizontal direction is extremely weak, and a light distribution characteristic of a wide angle range is obtained. On the other hand, in the case of the telephoto state, light is collected under the influence of the entire surface of the first optical panel 101. As for the second optical panel 105, the Fresnel lens portions having power in the horizontal direction and formed on the left and right sides, which do not function in the wide-angle state, function, and a light distribution characteristic in which light is collected closest to the central part is obtained.

As described above, in the reference example, in a zoom strobe device in which the distance between an optical panel and a light emitting portion is short, in order to obtain a sufficient light collecting effect, two Fresnel lenses are used as optical panels, and the resultant power thereof produces a greater light collecting effect. However, using a plurality of Fresnel lenses increases the number of times of entries into and exits from the optical panels, and the emission efficiency decreases due to surface reflection. In addition, since the number of components also increases, the cost increases, and adverse effects such as the increase in weight and the increase in the size of the device are caused.

The optical system of this embodiment capable of solving the above-described various problems will be described below.

Figure 3:
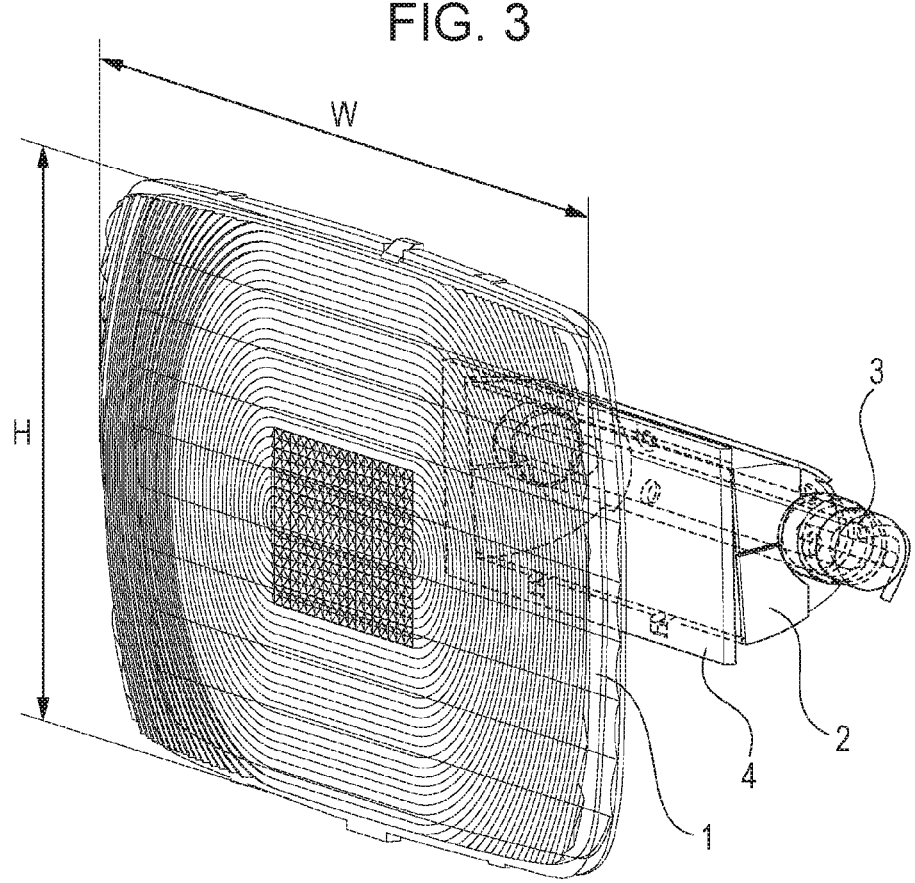
FIG. 3 is a perspective view of a main optical system relating to the irradiation range of the strobe device according to the embodiment of the present invention.
Figure 4A:
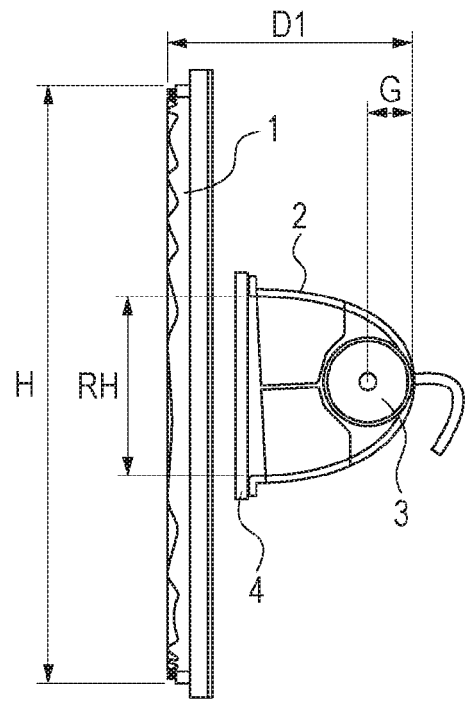
FIGS. 4A and 4B are side views of a main optical system relating to the irradiation range of the strobe device according to the embodiment of the present invention.
Figure 4B:
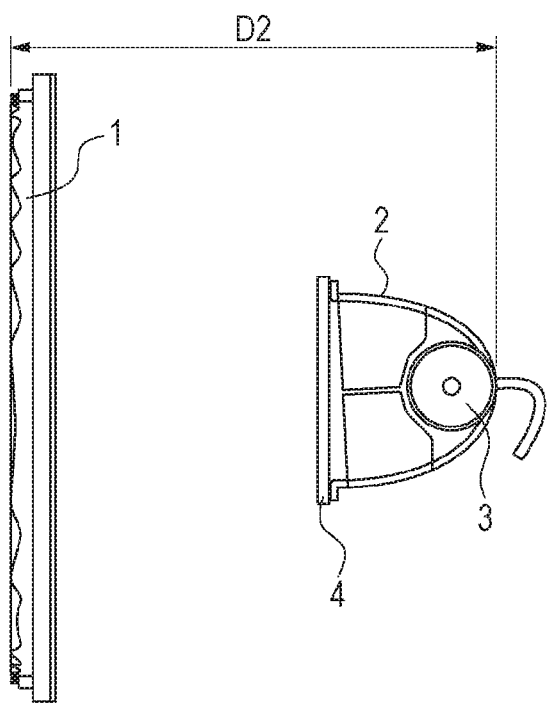
Figure 5A:
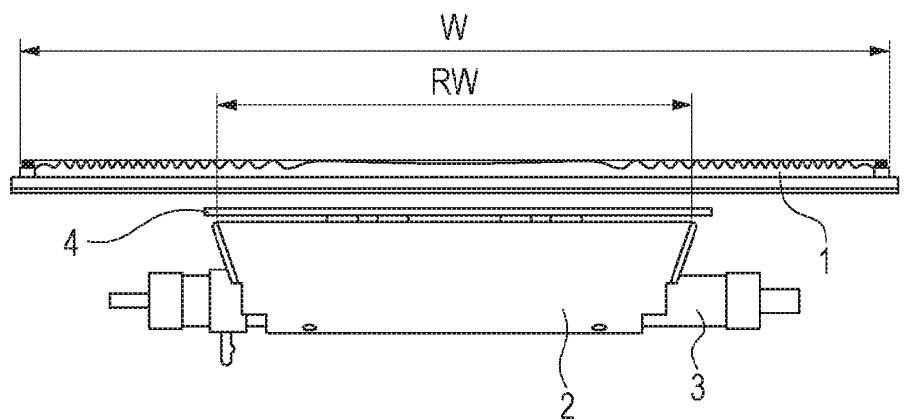
FIGS. 5A and 5B are top views of the main optical system relating to the irradiation range of the strobe device according to the embodiment of the present invention.
Figure 5B:
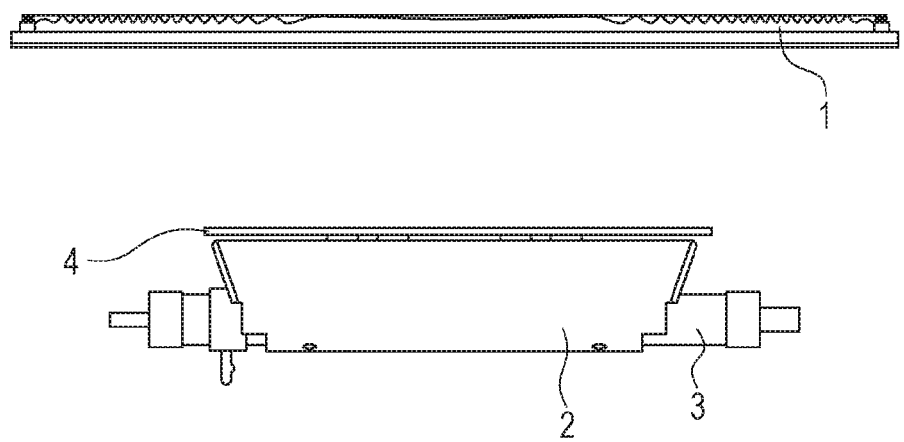

FIG. 3 is a perspective view of a part relating to the irradiation range (main optical system) of the strobe device according to this embodiment, FIGS. 4A and 4B are side views of the main optical system illustrated in FIG. 3, and FIGS. 5A and 5B are top views of the main optical system illustrated in FIG. 3. FIG. 4A and FIG. 5A illustrate a state in which the light emitting portion 21 is moved to the wide-angle end side (wide-angle state). FIG. 4B and FIG. 5B illustrate a state in which the light emitting portion 21 is moved to the telephoto end side (telephoto state).

As illustrated in FIGS. 4A and 4B, the vertical opening RH of the reflection umbrella 2 is about ⅓ the length of the vertical opening H of the optical panel 1. In this embodiment, for example, the vertical opening H is set to 28.8 mm, and the vertical opening RH is set to 8.6 mm. As for the opening in the horizontal direction, as illustrate in FIGS. 5A and 5B, the horizontal opening RW of the reflection umbrella 2 is about half the length of the opening W in the horizontal direction of the optical panel 1. In this embodiment, for example, the opening W in the horizontal direction is set to 60 mm, and the horizontal opening RW is set to 33 mm. As a result, the opening area of the reflection umbrella 2 is as small as about 17% of the opening area of the optical panel 1. Owing to this configuration, shapes such that two types of cylindrical concave surface having axial directions perpendicular to each other are crossed each other disposed in the center of the optical panel 1 (described later) can be used in the wide-angle state, and Fresnel lens portions having strong power disposed in the periphery of the optical panel 1 can be used in the telephoto state. Therefore, a large change in the irradiation range in the vertical and horizontal directions can be efficiently made.

Figure 6:
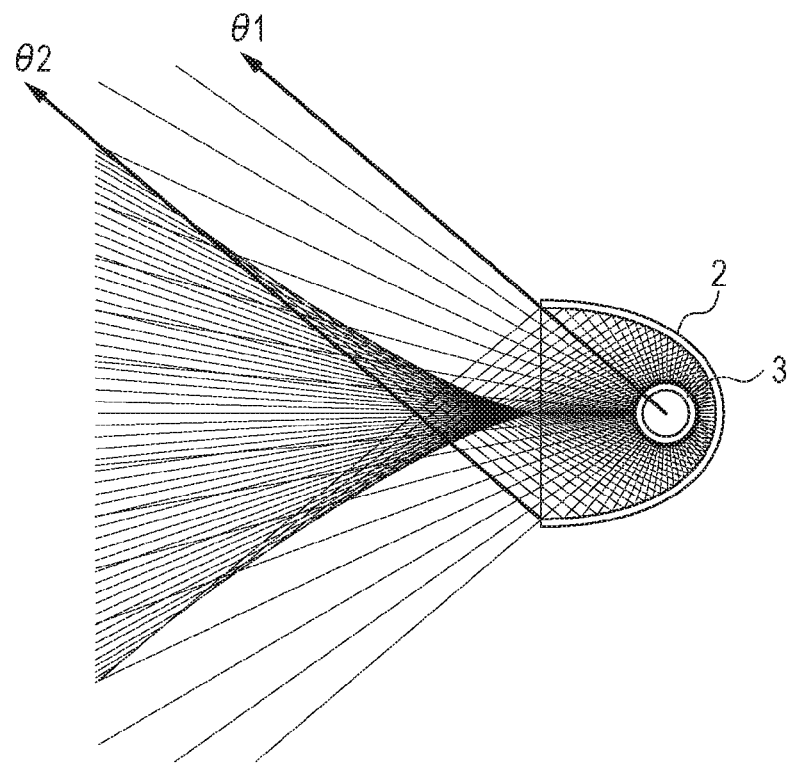
FIG. 6 illustrates the shape of a reflection umbrella of the strobe device according to the embodiment of the present invention.

FIG. 6 illustrates the shape of the reflection umbrella 2. The figure is a central sectional view of the light emitting portion 21 of this embodiment, and also illustrates a light ray trace from the light source center. Because the light collecting effect and diffusing effect of the protective panel 4 are negligible, the protective panel 4 is omitted in FIG. 6. Direct light directly emitted from the central part of the xenon tube 3 without being reflected by the reflection umbrella 2 is subjected to angle limitation by the opening of the reflection umbrella 2. In this embodiment, the shape of the opening is formed such that the maximum angle θ1 is limited to plus or minus 40° in the vertical direction. Therefore, the direct light can be emitted with uniform intensity within a range of plus or minus 40° in the vertical direction. The reflection umbrella 2 is formed such that, of the light rays emitted from the light source center, light rays traveling away from the opening of the reflection umbrella 2 are reflected and pass through the light source center again. The reflection umbrella 2 is also formed such that reflected light rays are uniformly distributed according to the angle at which they are emitted from the light source center, and the maximum angle θ2 reflected near the opening is equal to the maximum angle θ1 of the direct light. By thus configuring the reflection umbrella 2, light rays uniformly emitted 360° from the light source center can be uniformly emitted within a range of plus or minus 40° in the vertical direction.

FIG. 4A illustrates a wide-angle state in which the distance between the front end (the end farther from the light emitting portion 21) of the optical panel 1 and the back end (the end farther from the optical panel 1) of the reflection umbrella 2 is D1. In such an optical arrangement, the single optical panel 1 is disposed immediately in front of the reflection umbrella 2, and the influence of the opening area and the refractive power of the optical panel 1 is minimized, and therefore the light distribution characteristic is uniform. In the wide-angle state, only an extremely small region of the optical panel 1 is used, and the light distribution characteristic is limited almost only by the reflection umbrella 2. As a result, a uniformized extremely wide light distribution characteristic can be obtained.

FIG. 4B illustrates a telephoto state in which the distance between the front end of the optical panel 1 and the back end of the reflection umbrella 2 is D2. In such an optical arrangement, since the reflection umbrella 2 is sufficiently small, the angle difference between the direct light from the xenon tube 3 and the light reflected by the reflection umbrella 2 can be apparently reduced, and control can be efficiently performed with the single optical panel 1. As a result, light rays are incident on the entire surface of the optical panel 1 described later, and are efficiently collected due to the influence of Fresnel lens portions having strong power formed in the optical panel 1.

Figure 7:
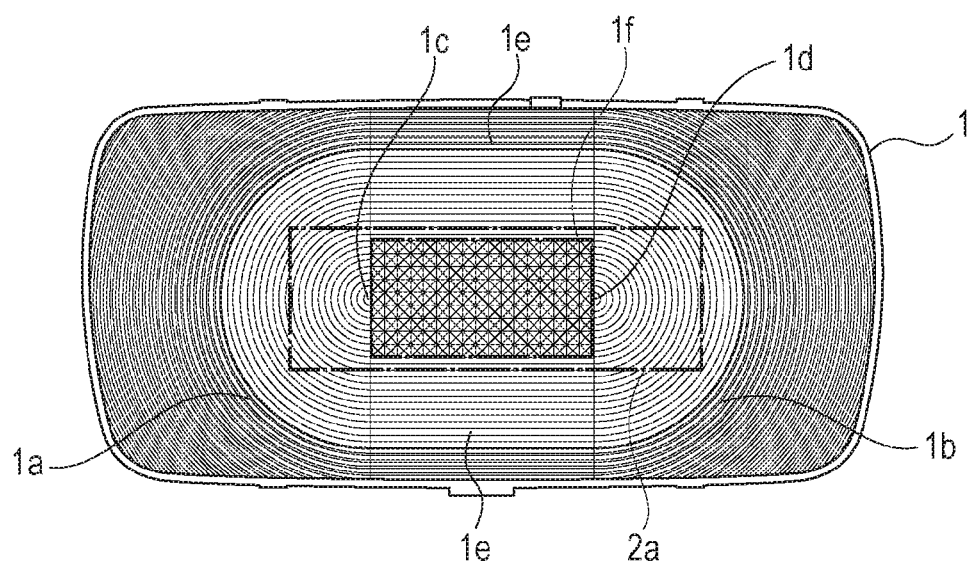
FIG. 7 illustrates the shape of the object side of an optical panel of the strobe device according to the embodiment of the present invention.

Next, the shape of the light exit side (the side farther from the light emitting portion 21) surface (exist surface) of the optical panel 1 will be described in detail with reference to FIGS. 7 and 8. The light exit side of the optical panel 1 consists of a plurality of regions having different optical characteristics: a central region 1f and peripheral regions 1a, 1b, and 1e. The central region 1f is a rectangular region in the center of the optical panel 1, and has a size covering the central part of the opening 2a of the reflection umbrella 2. Therefore, in a state in which the optical panel 1 and the light emitting portion 21 are closest to each other as in the wide-angle state, necessary and sufficient light distribution can be obtained owing to the central region 1f.

Figure 8B:
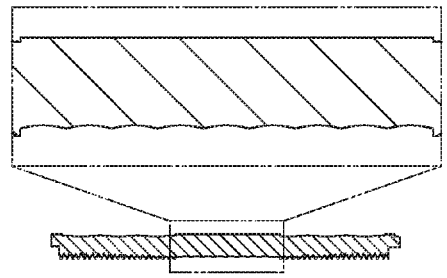
FIGS. 8A to 8C illustrate the shape of a central region of the object side of the optical panel of the strobe device according to the embodiment of the present invention.
Figure 8A:
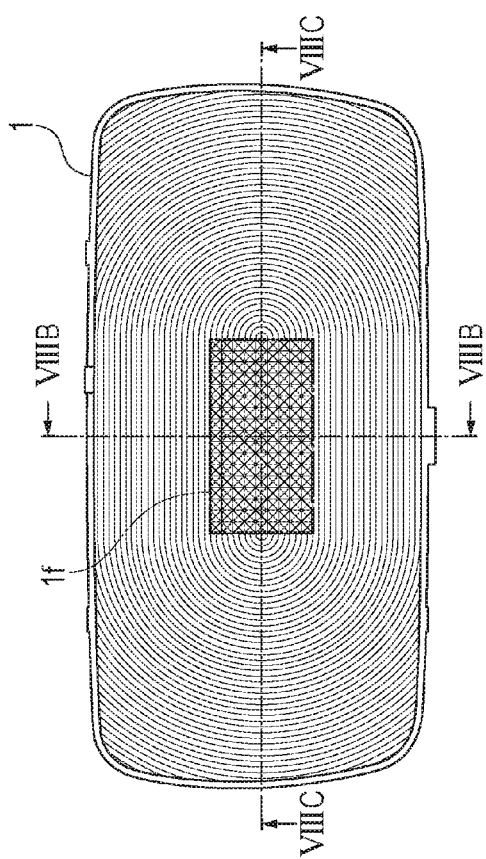
Figure 8C:
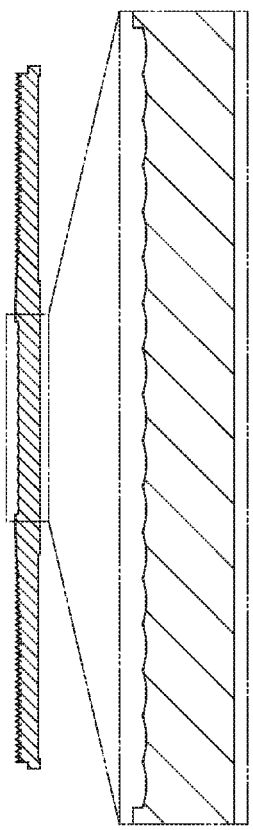
Figure 9:
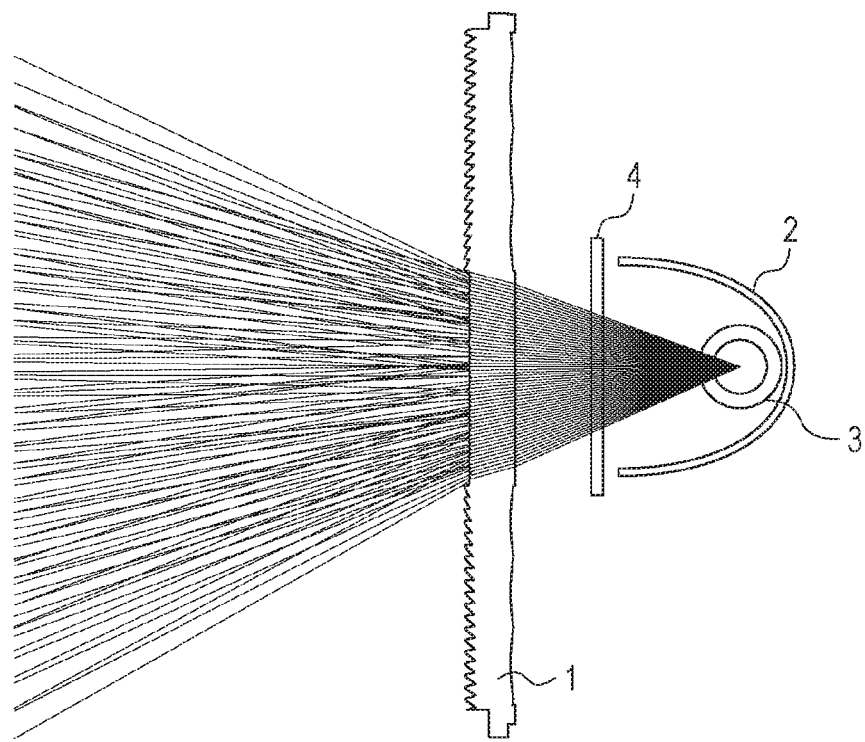
FIG. 9 illustrates a central sectional view of the optical panel of the strobe device according to the embodiment of the present invention, and a light ray trace.

FIGS. 8A to 8C illustrate the shape of the central region 1f. FIG. 9 is a central sectional view of the optical panel 1, and illustrates a light ray trace from the light source center.

As illustrated in FIGS. 8A to 8C, a plurality of cylindrical concave surfaces (first concave surface shapes) having axial directions (longitudinal directions) parallel to the longitudinal direction of the xenon tube 3 are formed in the central region 1f. In addition, a plurality of cylindrical concave surfaces (second concave surface shapes) having axial directions (longitudinal directions) perpendicular to the longitudinal direction of the xenon tube 3 are formed in the central region 1f. That is, a plurality of shapes such that two types of cylindrical concave surface having axial directions perpendicular to each other are crossed each other are formed in the central region 1f.

This is for the purpose of widening the irradiation range in the vertical and horizontal directions to the extent required in the wide-angle state in which the optical panel 1 and the xenon tube 3 are closest to each other. Attention is directed to light passing through the central region 1f. By the action of the concave surfaces formed in the central region 1f, light passing through the central region 1f is diffused in the vertical direction as illustrated in FIG. 9. By the action of the concave surfaces formed in the central region 1f, light passing through the central region 1f is diffused in the horizontal direction similarly to that illustrated in FIG. 9. The concave surfaces have weak power so that the loss of quantity of light due to diffusion is minimized in a state in which the optical panel 1 and the xenon tube 3 are away from each other, for example, the telephoto state. Therefore, the optical system has high emission efficiency.

In this embodiment, the plurality of cylindrical concave surfaces having axial directions parallel to the longitudinal direction of the xenon tube 3 and the plurality of cylindrical concave surfaces having axial directions perpendicular to the longitudinal direction of the xenon tube 3 have the same pitch, for example 1 mm, and the same curvature radius R, for example, 2 mm.

The peripheral regions 1a, 1b, and 1e are formed in the peripheral part of the optical panel 1. As illustrated in FIG. 7, the centers 1c and 1d of the two ring-shaped Fresnel lens portions 1a and 1b, respectively, are disposed on a line parallel to the longitudinal direction of the xenon tube 3. The centers 1c and 1d are disposed at positions such that they are in front of the xenon tube 3 in the wide-angle state. Fresnel lens portions 1e having power in the vertical direction are formed so as to be continuous with the two ring-shaped Fresnel lens portions 1a and 1b. The ring-shaped Fresnel lens portions 1a and 1b and the Fresnel lens portions 1e have the same focal length, for example, 19 mm.

Figure 10:
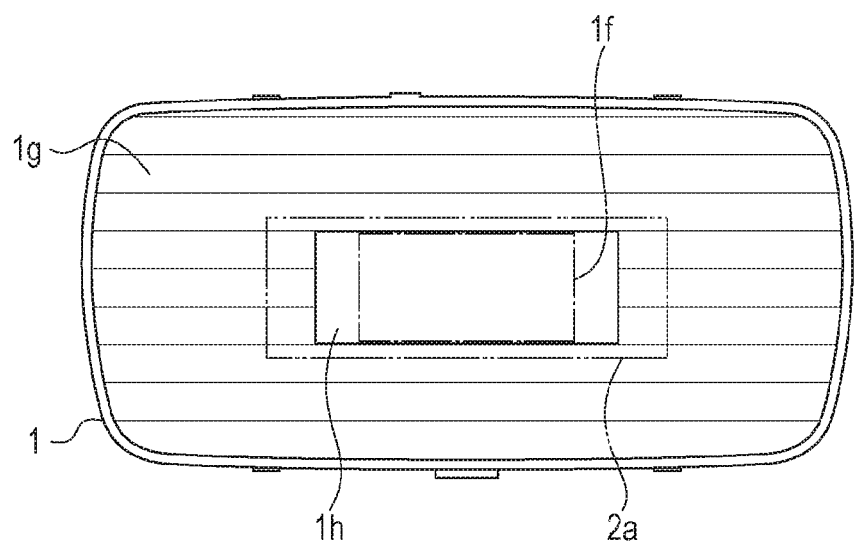
FIG. 10 illustrates the shape of the xenon tube side of the optical panel of the strobe device according to the embodiment of the present invention.
Figure 11:
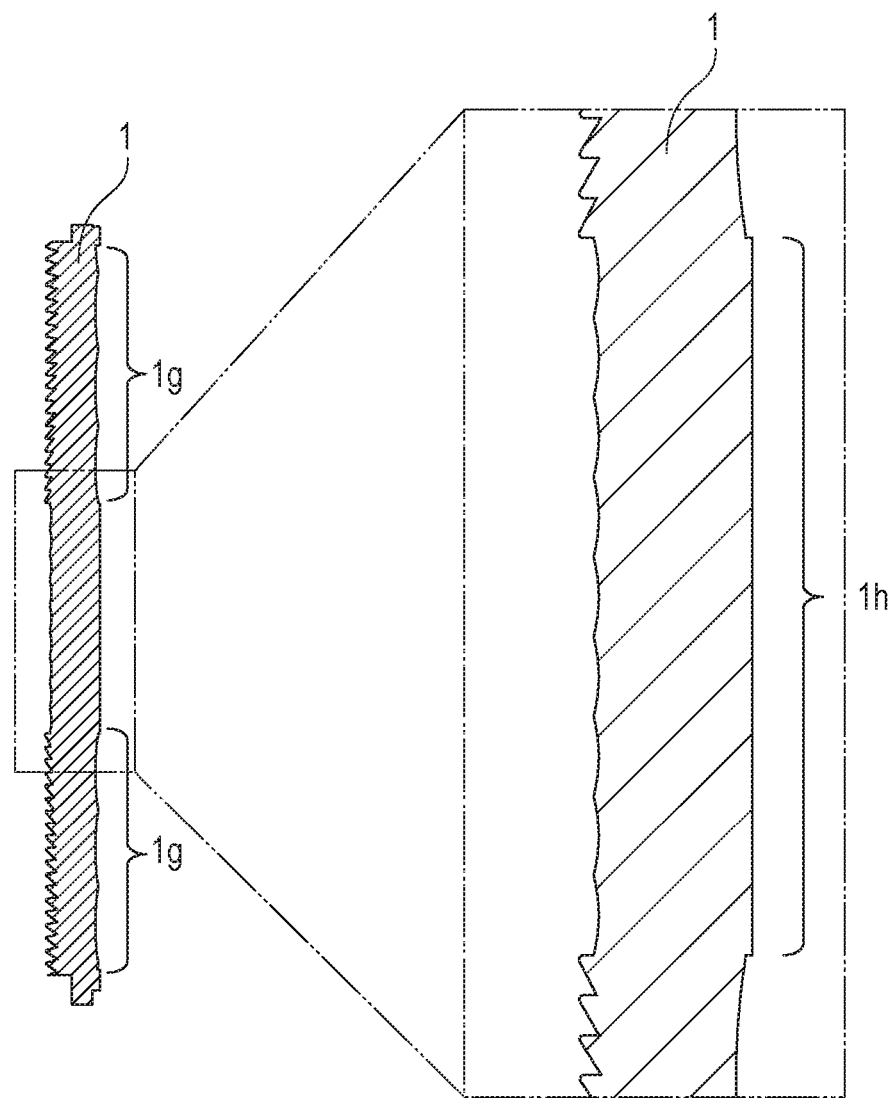
FIG. 11 is a sectional view illustrating the shape of the optical panel of the strobe device according to the embodiment of the present invention.

Next, the shape of the surface closer to the xenon tube 3 (entry surface), which is the light entry side surface, of the optical panel 1 will be described in detail with reference to FIG. 10 and FIG. 11. As illustrated in FIG. 10, the entry surface of the optical panel 1 consists of regions having different optical characteristics: a central region 1h and a peripheral region 1g. The central region 1h is a rectangular region in the center of the optical panel 1, and corresponds to a range covering the central part 1f formed on the light exit side. In the wide-angle state in which the optical panel 1 and the light emitting portion 21 are closest to each other, necessary and sufficient light distribution can be obtained owing to the central region 1f substantially equivalent to the central part of the opening 2a of the reflection umbrella 2 through which most of light from the xenon tube 3 passes. Although the central region 1h on the xenon tube 3 side has no optical characteristic, necessary and sufficient light distribution can be obtained owing to the shapes formed in the central region 1f on the light exit side. In this embodiment, by forming an embossed surface in the central region 1h, more uniform light distribution is achieved.

The peripheral region 1g is formed in the peripheral part of the optical panel 1, and is a region including a plurality of cylindrical concave surfaces (third concave surfaces) having axial directions (longitudinal directions) parallel to the longitudinal direction of the xenon tube 3. In an optical system such that the focal length is short and the travel distance during irradiation range change is small, a phenomenon such that an image of the xenon tube 3 is formed on the surface of an object occurs in the telephoto state. The xenon tube 3 is generally arranged horizontally. The irradiation range is often horizontally elongated compared to the required irradiation range unless the traveling direction of light emitted from the xenon tube 3 is changed using an optical panel or the like. So, in this embodiment, in order to widen the irradiation range in the vertical direction, a plurality of cylindrical concave surfaces having axial directions (longitudinal directions) parallel to the longitudinal direction of the xenon tube 3 are formed in the peripheral part of the xenon tube side of the optical panel 1. A light distribution characteristic balanced in the horizontal and vertical directions can thereby be obtained. The power of the plurality of concave surfaces in the peripheral region 1g may be relatively weak, and the loss of quantity of light due to diffusion in the telephoto state can be minimized. Therefore, the optical system can have higher efficiency. In this embodiment, the pitch and the curvature radius R of the plurality of concave surfaces in the central region 1g are different from the pitch and the curvature radius R of the plurality of concave surfaces in the central region 1f on the light exit side, and are, for example, 3 mm and 9 mm, respectively.

As described above, in this embodiment, a plurality of shapes such that two types of cylindrical concave surface having axial directions perpendicular to each other are crossed each other are formed in the central region of the optical panel disposed in front of the light emitting portion. In this embodiment, by forming such shapes in the central region 1f, regions having weak optical power and regions having strong optical power are formed in one optical panel. By using an optical panel having such shapes, a lighting device capable of changing the light irradiation range can be provided that can suppress the decrease in quantity of light when the irradiation range is narrowed, while suppressing the increase in the size of the device.

By reducing the size of the opening 2a of the reflection umbrella 2 and apparently reducing the angle difference between the direct light from the xenon tube 3 and the light reflected by the reflection umbrella 2, the irradiation range at the telephoto end side is efficiently controlled with the single optical panel 1. Therefore, even when the distance between the xenon tube 3 and the optical panel 1 is small, the necessary quantity of light can be obtained.

Although, in this embodiment, the center 1c and the center 1d of the ring-shaped Fresnel lens portions 1a and 1b, respectively, formed on the light exit side of the optical panel 1 are separate, the ring-shaped Fresnel lens portions 1a and 1b may share a common center at the center of the optical panel 1.

In this embodiment, shapes such that two types of cylindrical concave surface having axial directions perpendicular to each other are crossed each other are formed in the central region 1f on the light exit side. However, the same shapes may be formed in a region on the light entry side corresponding to the central region 1f, and a flat surface or an embossed surface having no optical characteristic may be formed in the central region 1f on the light exit side. That is, shapes such that two types of cylindrical concave surface having axial directions perpendicular to each other are crossed each other may be formed in one of the central region on the light entry side and the central region on the light exit side of the optical panel 1, and a flat surface or an embossed surface may be formed on the other.

In this embodiment, shapes such that two types of cylindrical concave surface having axial directions perpendicular to each other are crossed each other is formed in the central region 1f on the light exit side. However, as long as the same effect as in the case where the axes of two types of cylindrical concave surfaces are perpendicular to each other can be obtained, the axes may not be perpendicular to each other. For example, the cylindrical concave surfaces having axial directions perpendicular to the longitudinal direction of the xenon tube 3 may be cylindrical concave surfaces having axial directions substantially perpendicular to the longitudinal direction of the xenon tube 3. Alternatively, the cylindrical concave surfaces having axial directions parallel to the longitudinal direction of the xenon tube 3 may be cylindrical concave surfaces having axial directions substantially parallel to the longitudinal direction of the xenon tube 3. Alternatively, the axes of the two types of cylindrical concave surfaces may be both inclined.

However, if the axes are too inclined, the obtained effect may diminish, and the desired light distribution may not be achieved. Therefore, the inclination angle of each axis is preferably three degrees or less.

Although, in this embodiment, shapes such that two types of cylindrical concave surface having axial directions perpendicular to each other are crossed each other are formed in an optical panel, the optical member in which shapes such that two types of cylindrical concave surface having axial directions perpendicular to each other are crossed each other are formed is not limited to a panel.

Although this embodiment has a protective panel 4, the present invention is applicable to a configuration without a protective panel.

Although this embodiment is a lighting device detachably mounted on a photographing device, the present invention may be applied to a photographing device having a built-in lighting device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115231, filed Jun. 5, 2015, which is hereby incorporated by reference herein in its entirety.

What is claimed is:

1. A lighting device capable of changing the light irradiation range comprising:
a light emitting portion; and
an optical member disposed in front of the light emitting portion,
wherein the optical member has a plurality of shapes such that two types of cylindrical concave surface having axial directions substantially perpendicular to each other are crossed each other, the plurality of shapes being formed in a central region of an entry surface through which light from the light emitting portion enters or a central region of an exit surface through which the light entering through the entry surface exits.

2. The lighting device according to claim 1, wherein one of the two types of cylindrical concave surface has an axis parallel to the longitudinal direction of the light emitting portion, and the other of the two types of cylindrical concave surface has an axis perpendicular to the longitudinal direction of the light emitting portion.

3. The lighting device according to claim 1, wherein the light emitting portion has a cylindrical light source, and a reflecting member reflecting light from the light source toward the optical member, and wherein the size of the central region in which the plurality of shapes such that two types of cylindrical concave surface having axial directions substantially perpendicular to each other are crossed each other are formed is less than or equal to the size of an opening for the reflecting member to reflect the light from the light source toward the optical member.

4. The lighting device according to claim 1, wherein the optical member has Fresnel lens portions formed in peripheral regions around the central region in which the plurality of shapes such that two types of cylindrical concave surface having axial directions substantially perpendicular to each other are crossed each other are formed.

5. The lighting device according to claim 4, wherein the Fresnel lens portions include Fresnel lens portions having power in the vertical direction formed in peripheral regions above and below the central region in which the plurality of shapes such that two types of cylindrical concave surface having axial directions substantially perpendicular to each other are crossed each other are formed.

6. The lighting device according to claim 4, wherein the Fresnel lens portions include ring-shaped Fresnel lens portions formed in peripheral regions on the left and right sides of the central region in which the plurality of shapes such that two types of cylindrical concave surface having axial directions substantially perpendicular to each other are crossed each other are formed.

7. The lighting device according to claim 1, wherein the plurality of shapes such that two types of cylindrical concave surface having axial directions substantially perpendicular to each other are crossed each other are formed in one of the central region of the entry surface through which light from the light emitting portion enters and the central region of the exit surface through which light entering through the entry surface exits, and an embossed surface is formed in the other of the central region of the entry surface through which light from the light emitting portion enters and the central region of the exit surface through which light entering through the entry surface exits.

8. The lighting device according to claim 7, wherein, of the central region of the entry surface through which light from the light emitting portion enters and the central region of the exit surface through which light entering through the entry surface exits, the central region in which the embossed surface is formed has a size greater than or equal to the size of the central region in which the plurality of shapes such that two types of cylindrical concave surface having axial directions substantially perpendicular to each other are crossed each other are formed.

9. The lighting device according to claim 7, wherein a cylindrical concave surface having an axis parallel to the longitudinal direction of the light emitting portion is formed in a peripheral region around the central region in which the embossed surface is formed.

10. The lighting device according to claim 7, wherein the plurality of shapes such that two types of cylindrical concave surface having axial directions substantially perpendicular to each other are crossed each other are formed in the central region of the exit surface through which the light entering through the entry surface exits.

11. The lighting device according to claim 1, wherein the lighting device changes the irradiation range by changing the relative positions of the light emitting portion and the optical member.

* * * * *